United States Patent [19]

Kaltenbach et al.

[11] 4,399,230
[45] Aug. 16, 1983

[54] METHOD OF PLUGGING THE ENDS OF SELECTED DUCTS AND A PASTE FOR USE IN SAID METHOD

[75] Inventors: Guy Kaltenbach, Versailles; Pierre Lerner, Chevry, both of France

[73] Assignee: Societe Anonyme dite: Compagnie Generale d'Electricite, Paris, France

[21] Appl. No.: 342,281

[22] Filed: Jan. 25, 1982

[30] Foreign Application Priority Data

Jan. 26, 1981 [FR] France ............................... 81 01374
Jun. 24, 1981 [FR] France ............................... 81 12372

[51] Int. Cl.³ .............................................. C03C 5/00
[52] U.S. Cl. ..................................................... 501/20
[58] Field of Search ............................................. 501/20

[56] References Cited

U.S. PATENT DOCUMENTS

| | | | |
|---|---|---|---|
| 2,610,128 | 9/1952 | Kerridge et al. | 501/20 |
| 2,848,339 | 8/1958 | Jessen | 501/20 |
| 3,366,502 | 1/1968 | Lombardo | 106/314 |
| 4,021,256 | 5/1977 | Oda | 106/74 |

FOREIGN PATENT DOCUMENTS 1399915  7/1975  United Kingdom ................ 106/314

Primary Examiner—James Poer
Attorney, Agent, or Firm—Sughrue, Mion, Zinn, Macpeak and Seas

[57] ABSTRACT

A method of plugging the ends of selected ducts (5) in a ceramic structure (1). A paste (8, 9) is prepared from a powder and a liquid. The powder comprises a glass whose coefficient of expansion is close to that of the ceramic structure. The liquid comprises a solvent, a plasticizer and an additive which reduces the adherence of the paste to a paste applying tool (6, 7). The tool is used to push paste into the ends of the selected ducts and the ceramic structure is subjected to heat treatment to ensure that the paste adheres to the walls of the ducts and then becomes solid.

18 Claims, 1 Drawing Figure

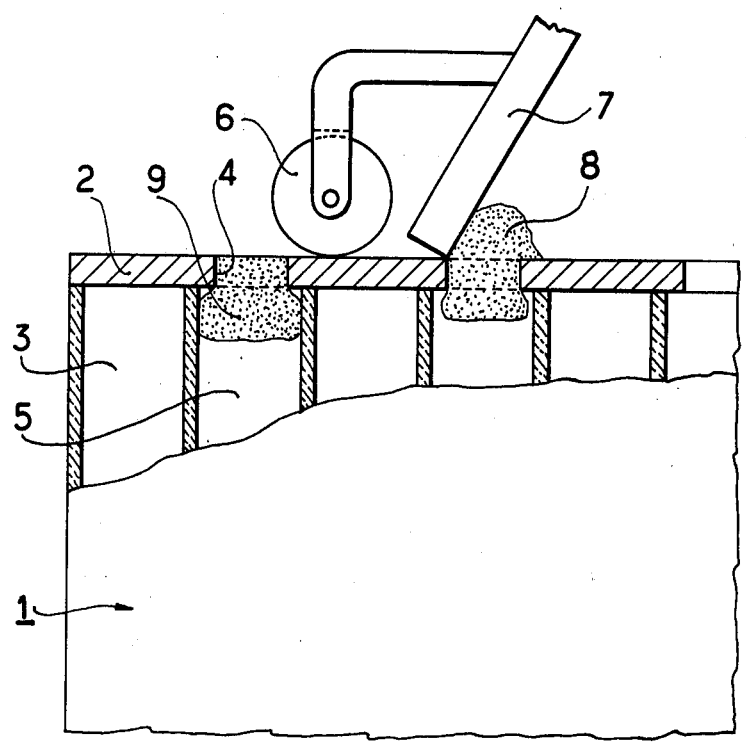

METHOD OF PLUGGING THE ENDS OF SELECTED DUCTS AND A PASTE FOR USE IN SAID METHOD

The present invention relates to a method of plugging the ends of selected ducts in a ceramic structure.

It also relates to a paste for use in said method.

BACKGROUND OF THE INVENTION

CERAVER's Document FR-A-2 No. 2436958 describes a heat exchanger unit with parallel ducts obtained by extrusion in which the ends of a first series of ducts which are to be kept open are temporarily masked by detachable screens of flexible material, the end of the heat exchange unit is dipped in viscous slip which is thereby caused to enter the ends of a second series of ducts which are not masked, the heat exchange unit is fired so as to fix the slip which enters the ends of said second series of ducts and the detachable screens are removed to uncover the openings of the ducts of the first series. Such a method takes a relatively long time since it requires each row of ducts whose ends are to be kept open to be masked temporarily and it is difficult to apply it to structures with ducts of small transversal dimensions.

Preferred embodiments of the present invention provide a method of closing the ends of selected ducts which is easier and quicker to put into practice and which can be applied without difficulty even to ducts of small transversal cross-section, i.e. a few millimeters or even less.

SUMMARY OF THE INVENTION

In a first aspect, the present invention provides a method of plugging the ends of selected ducts in a ceramic structure, the method comprising preparing a paste comprising a mixture of a solid phase and a liquid phase, the solid phase comprising powder of a glass whose coefficient of expansion is close to that of the ceramic structure and the liquid phase containing a solvent, a plasticizer and an additive which reduces the adherence of the paste to a paste-applicator tool; using the applicator tool to push said paste into the ends of the ducts which are to be plugged; and heat treating the ceramic structure to ensure that the paste adheres to the walls of the ducts and becomes solid.

Preferably a stencil plate is used to select which ducts are plugged. The paste is pushed through holes in the stencil plate.

In a second aspect, the present invention also provides a paste compound for plugging the ends of select ducts in a ceramic structure, said paste comprising a solid phase which contains powder of a glass with a coefficient of expansion close to that of the ceramic structure and a liquid phase which contains a solvent, a plasticizer and an additive to reduce the adherence of the paste to a paste applicator tool.

Various useful paste compositions are as follows, (all percentages are molar):

the major part of the solid phase is a powder of the substance from which the ceramic structure is made, the rest being constituted mainly by glass;

the glass used contains 18% to 80% silica, 3% to 13% alumina, 9% to 60% boron oxide, 0% to 5.5% zinc oxide, 0% to 17% barium oxide, and 0% to 14% sodium oxide;

the glass used contains about 71% silica, 3.7% alumina, 15.5% boron oxide, 1.5% zinc oxide, and 8% sodium oxide;

the glass used contains about 23% silica, 8% alumina, 51% boron oxide, 15% barium oxide, and 2.7% sodium oxide;

the glass used contains 50% to 80% germanium oxide, 1% to 20% magnesium oxide, 0% to 20% calcium oxide, 0% to 20% strontium oxide, 0% to 20% zinc oxide, 1% to 10% alumina, 0% to 50% lead monoxide, 0% to 10% sodium oxide and/or potassium oxide, and 0% to 20% strontium fluoride;

the glass used contains about 60% germanium oxide, 10% magnesium oxide, 10% calcium oxide, 5% zinc oxide, 10% alumina, and 5% sodium oxide;

the glass used contains about 57% germanium oxide, 9.5% magnesium oxide, 14% calcium oxide, 5% zinc oxide, 5% alumina, and 10% lead monoxide;

the glass used contains 40% to 80% germanium oxide, 6% to 30% boron oxide, 0% to 20% calcium oxide, 0% to 20% zinc oxide, and 0% to 50% lead monoxide, and preferably about 43% germanium oxide, 26% boron oxide, 16% calcium oxide, 11% zinc oxide and 4% of lead monoxide.

The glss used contains 30% to 80% germanium oxide, 6% to 30% boron oxide, 0% to 20% calcium oxide, 0% to 20% magnesium oxide, 0% to 20% zinc oxide, 5% to 20% alumina and 0% to 50% lead monoxide, and preferably about 37.5% of germanium oxide, 28% boron oxide, 7% calcium oxide, 10% magnesium oxide, 9.5% zinc oxide and 8% alumina.

The glass used contains at least 30% boron oxide, 1% to 55% zinc oxide, 0% to 5% vanadium pentoxide, and 0% to 5% alumina, and preferably about 37% boron oxide, 54% zinc oxide, 5% vanadium pentoxide, and 4% alumina.

BRIEF DESCRIPTION OF THE DRAWING

Both a method of plugging selected ducts in a heat exchanger unit of honeycomb configuration, and a paste for plugging the ducts, (includding glass compounds to be incorporated in the paste) are described below by way of example with reference to the sole FIGURE of the accompanying drawing.

The sole FIGURE is a diagrammatic illustration of means for closing every other row of parallel ducts in an alumina heat exchanger unit 1 with the aid of a stencil plate 2.

MORE DETAILED DESCRIPTION

The stencil plate 2 is disposed on the end surfaces of a set of ducts and has alternate openings which provide access to the ends of only every other row of ducts. It will be understood that the rows of ducts and the stencil plate extend perpendicularly to the plane of the FIGURE. First ducts such as 3 are temporarily masked by the stencil plate while openings 4 in the plate leave the ends of second ducts 5 free. A paste applying tool comprising a roller 6 with a scraper blade 7 pushes paste compound 8 into each opening as it passes over the opening. A mass 9 plugs the end of the duct 5 and comes flush with the edges of the opening 4 in the stencil plate.

The paste compound 9 is prepared as follows.

Glass of the following molar composition is prepared:

| | |
|---|---|
| Germanium oxide GeO$_2$ | 60% |

-continued

| | |
|---|---|
| Calcium oxide CaO | 10% |
| Magnesium oxide MgO | 10% |
| Zinc oxide ZnO | 5% |
| Alumina Al₂O₃ | 10% |
| Sodium oxide Na₂O | 5% |

Said glass is prepared in the usual way by intimately mixing in required proportions the ingredients in the form of finely divided powders and then melting the mixture in an electric furnace. The molten mixture is then refined after which it is cast and crushed.

The powder obtained is intimately mixed with a liquid in a ratio of 75% powder to 25% liquid by weight. The liquid is made up as follow (the units are grams):

| | |
|---|---|
| Lanolin | 40 g |
| Castor oil | 34 g |
| Ethyl-cellulose (binder) | 0,2 g |
| Butyl ether of ethylene-glycol as solvent (Ethyl-Cellosolve trade mark) | 65 g |
| Dibutylphthalate (plasticizer) | 34 g |

The effect of lanolin is to reduce the adhesion of the paste of the stencil plate. Monoethyl ether of ethylene glycol can also be used as the solvent.

The paste obtained is then applied to the stencil plate as described hereinabove.

Once all the required duct ends are closed, the paste is dried by allowing the solvent to evaporate then the paste is fired so as to make the plugs formed by the glass adhere firmly to the walls at the duct ends. The glass obtained has a coefficient of linear expansion of $7.4 \times 10^{-6}/°C$ between 20° C. and 500° C. which is very close to that of alumina ($7.2 \times 10^{-6}/°C$ from 20° C. to 400° C.). The closed ducts thus remain perfectly sealed despite the thermal expansion and contraction of the heat exchanger unit.

Instead of glass with the above composition, lead monoxide glass can be used which has the following molar composition:

| | |
|---|---|
| Germanium oxide | 56.95% |
| Calcium oxide | 14.2% |
| Magnesium oxide | 9.5% |
| Zinc oxide | 4.7% |
| Alumina | 4.7% |
| Lead monoxide | 10% |

Such glass has a coefficient of linear expansion of $6.85 \times 10^{-6}/°C$ between 20° C. and 500° C. which is also very close to that of alumina.

Silica glass A or silica glass B can also be used having the following molar compositions:

| | A | B |
|---|---|---|
| Silica | 71% | 23.3% |
| Alumina | 3.75% | 8% |
| Boron oxide | 15.5.% | 51% |
| Zinc oxide | 1.55% | |
| Barium oxide | | 15% |
| Sodium oxide | 8.2% | 2.7% |

Type A glass and type B glass have linear coefficients of expansion of $5.1 \times 10^{-6}/°C$ and $6.6 \times 10^{-6}/°C$ respectively between 20° C. and 500° C.

| Boron oxide glass of molar composition: | |
|---|---|
| Boron oxide | 36.8% |
| Zinc oxide | 54.1% |
| Alumina | 4.3% |
| Vanadium pentoxide V₂O₅ | 4.8% | is also suitable. Its coefficient of linear expansion between 20° C. and 500° C. is $5.3 \times 10^{-6}/°C$.

| Glass whose molar composition is: | |
|---|---|
| Germanium oxide | 43% |
| Boron oxide | 26% |
| Calcium oxide | 16% |
| Zinc oxide | 11% |
| Lead monoxide | 4% | has a coefficient of linear expansion of $6.35 \times 10^{-6}/°C$ between 20° C. and 500° C. It melts in a lower temperature range than the preceding types of glass, melting completely below 1000° C.

| Glass whose molar composition is | |
|---|---|
| Germanium oxide | 37.5.% |
| Boron oxide | 28% |
| Calcium oxide | 7% |
| Magnesium oxide | 10% |
| Zinc oxide | 9.5% |
| Alumina | 8% | has a melting temperature of about 970° C. and an average coefficient of linear expansion of $6.2 \times 10^{-6}/°C$ at a temperature of between 30° C. and 400° C.

If glass were used which has the same general composition but contains no alumina 2 phases would be formed during melting and recrystallisation would occur to some extent on cooling.

The above types of glass are suitable for plugging the ends of alumina ducts; some of these compounds can be used with other substances such as silicon carbide or mullite.

The pastes can also be inserted in the duct ends by a silk screen process. It can be pushed into the ducts by means of a scraper comb or by gas pressure. Measured quantities of paste can also be inserted in the ends of the ducts by means of one or more syringes which are moved in a programmed sequence so as to come adjacent to the ends only of the ducts which are to be closed.

To improve matching of the coefficient of thermal expansion of the plugging substance with that of the ceramic structure, in particular when the coefficient of expansion of the glass used is not entirely satisfactory., a plugging substance can be used in which the major part is a powder of the substance from which the ceramic structure is made, while the rest is mainly glass, (i.e. is glass plus impurities).

We claim:

1. A method of plugging the ends of selected ducts in a ceramic honeycomb heat exchange structure, the method comprising the steps of:
   preparing a paste comprising a mixture of a solid phase and a liquid phase, the solid phase comprising powder of a glass whose coefficient of expansion is close to that of the ceramic structure and the liquid phase containing a solvent, a plasticizer and an additive which reduces the adherence of the paste to a paste-applicator tool;

using an applicator tool to push said paste into the ends of selected ducts which are to be plugged; and heating the ceramic structure to fire the paste to cause it to sealably adhere to the walls of the ducts and become solid such that the closed ducts of said ceramic honeycomb heat exchange structure remain perfectly sealed during use irrespective of thermal expansion and contraction of the heat exchange unit.

2. A method according to claim 1, wherein the paste is pushed into those duct ends which are to be plugged, through holes within a stencil plate overlying the ends of said ducts with said holes defining the duct ends to be selectively plugged.

3. A paste compound for sealably plugging the ends of selected ducts in a ceramic honeycomb heat exchange structure, said paste comprising a solid phase which contains powder of a glass with a coefficient of expansion close to that of the ceramic structure and a liquid phase which contains a solvent, a plasticizer and an additive to reduce the adherence of the paste to a paste applicator tool employed for pressure application of said paste into the ends of said selected ducts of said ceramic honeycomb heat exchange structure.

4. A paste compound according to claim 3, containing at least 70% solid phase.

5. A paste compound according to claim 4, wherein the major part of the solid phase is a powder of the substance from which the ceramic structure is made, the rest being constituted mainly by glass.

6. A paste compound according to claim 4, wherein the glass used contains 18% to 80% silica, 3% to 13% alumina, 9% to 60% boron oxide, 0% to 5.5% zinc oxide, 0% to 17% barium oxide, and 0% to 14% sodium oxide, the percentages being molar.

7. A paste compound according to claim 6, wherein the glass used contains about 71% silica, 3.7% alumina, 15.5% boron oxide, 1.5% zinc oxide, and 8% sodium oxide, the percentages being molar.

8. A paste compound according to claim 6, wherein the glass used contains about 23% silica, 8% alumina, 51% boron oxide, 15% barium oxide, and 2.7% sodium oxide, the percentages being molar.

9. A paste compound according to claim 6, wherein the glass used contains 50% to 80% germanium oxide, 1% to 20% magnesium oxide, 0% to 20% calcium oxide, 0% to 20% strontium oxide, 0% to 20% zinc oxide, 1% to 10% alumina, 0% to 50% lead monoxide, 0% to 10% sodium oxide and/or potassium oxide, and 0% to 20% strontium fluoride, the percentages being molar.

10. A paste compound according to claim 9, wherein the glass used contains about 60% germanium oxide, 10% magnesium oxide, 10% calcium oxide, 5% zinc oxide, 10% alumina, and 5% sodium oxide, the percentages being molar.

11. A paste compound according to claim 9, wherein the glass used contains about 57% germanium oxide, 9.5% magnesium oxide, 14% calcium oxide, 5% zinc oxide, 5% alumina, and 10% lead monoxide, the percentages being molar.

12. A paste compound according to claim 4, wherein the glass used contains 40% to 80% germanium oxide, 6% to 30% boron oxide, 0% to 20% calcium oxide, 0% to 20% zinc oxide, and 0% to 50% lead monoxide, the percentages being molar.

13. A paste compound according to claim 12, wherein the glass used contains about 43% germanium oxide, 26% boron oxide, 16% calcium oxide, 11% zinc oxide and 4% lead monoxide, the percentages being molar.

14. A paste compound according to claim 4, wherein the glass used contains 30% to 80% germanium oxide, 6% to 30% boron oxide, 0% to 20% calcium oxide, 0% to 20% magnesium oxide, 0% to 20% zinc oxide, 5% to 20% alumina and 0% to 50% lead monoxide, the percentages being molar.

15. A paste compound according to claim 14, wherein the glass used contains about 37.5% germanium oxide, 28% boron oxide, 7% calcium oxide, 10% magnesium oxide, 9.5% zinc oxide and 8% alumina, the percentages being molar.

16. A paste compound according to claim 4, wherein the glass used contains at least 30% boron oxide, 1% to 55% zinc oxide, 0% to 5% vanadium pentoxide, and 0% to 5% alumina, the percentages being molar.

17. A paste compound according to claim 16, wherein the glass used contains about 37% boron oxide, 54% zinc oxide, 5% vanadium pentoxide, and 4% alumina, the percentages being molar.

18. The paste compound according to claim 3, wherein said additive comprises lanolin.

* * * * *